(12) United States Patent
Patel

(10) Patent No.: US 12,619,655 B2
(45) Date of Patent: *May 5, 2026

(54) SYSTEM AND METHOD TO GENERATE SUGGESTIONS BASED ON DYNAMIC NOTIFICATION DATA

(71) Applicant: DISH Wireless L.L.C., Englewood, CO (US)

(72) Inventor: Jaynish Shashikant Patel, Muskegon, MI (US)

(73) Assignee: Boost SubscriberCo L.L.C., Englewood, CO (US)

( * ) Notice: Subject to any disclaimer, the term of this patent is extended or adjusted under 35 U.S.C. 154(b) by 2 days.

This patent is subject to a terminal disclaimer.

(21) Appl. No.: 18/461,687

(22) Filed: Sep. 6, 2023

(65) Prior Publication Data

US 2025/0077570 A1 Mar. 6, 2025

(51) Int. Cl.
G06F 16/535 (2019.01)
G06F 3/16 (2006.01)
(Continued)

(52) U.S. Cl.
CPC ............ G06F 16/535 (2019.01); G06F 3/162 (2013.01); G06F 16/538 (2019.01);
(Continued)

(58) Field of Classification Search
CPC ...... G06F 16/535; G06F 3/162; G06F 16/538; G06F 16/5846; G06V 20/50; G06V 20/63
See application file for complete search history.

(56) References Cited

U.S. PATENT DOCUMENTS 6,728,349 B2 * 4/2004 Chang ................... H04M 1/575
379/142.01
8,200,662 B2 6/2012 Reitter et al.
(Continued)

OTHER PUBLICATIONS

Jaynish Shashikant Patel, System and Method to Generate Suggestions Based on Dynamic Banner Data, U.S. Appl. No. 18/461,702, filed Sep. 6, 2023, pp. 1-43.

*Primary Examiner* — William Spieler
(74) *Attorney, Agent, or Firm* — Baker Botts L.L.P.

(57) ABSTRACT

An apparatus comprises a memory and a processor communicatively coupled to one another. The memory may be configured to store multiple existing configuration commands instructing execution of one or more operations. The processor may be configured to perform multiple existing operations in accordance with the existing configuration commands, collect dynamic notification data from one or more interfaces configured to perform the existing operations, generate multiple dynamic configuration commands based on the dynamic notification data, and compare the dynamic configuration commands to the existing configuration commands. Further, the processor is configured to determine whether the dynamic configuration commands comprise commands that are different from those comprised in the plurality of existing configuration commands, generate at least one suggestion to perform multiple suggested operations based on dynamic configuration commands, and present the at least one suggestion in a dynamic notification via the one or more interfaces.

20 Claims, 7 Drawing Sheets

NOTIFICATION OPERATIONS 200B

USER EQUIPMENT 110A

WALKING DIRECTION TO "ICE CREAM SHOP ONE"
~10 MINS. | 1 MILE~

DYNAMIC NOTIFICATION 210A

PLEASE GET SOME ICE CREAM

WHAT FLAVOR?

STRAWBERRY OR ROCKY ROAD IS FINE

OK

(51) Int. Cl.

| | |
|---|---|
| *G06F 16/538* | (2019.01) |
| *G06F 16/583* | (2019.01) |
| *G06V 20/50* | (2022.01) |
| *G06V 20/62* | (2022.01) |

(52) U.S. Cl.
CPC .......... *G06F 16/5846* (2019.01); *G06V 20/50* (2022.01); *G06V 20/63* (2022.01)

(56) References Cited

U.S. PATENT DOCUMENTS

| | | | |
|---|---|---|---|
| 8,516,377 | B2 | 8/2013 | Dixon et al. |
| 8,554,571 | B1 | 10/2013 | Harrison, Jr. |
| 8,577,719 | B2 | 11/2013 | Bainbridge et al. |
| 8,799,756 | B2 | 8/2014 | Grosz et al. |
| 8,799,829 | B2 | 8/2014 | Grosz et al. |
| 8,806,331 | B2 | 8/2014 | Grosz et al. |
| 9,218,344 | B2 | 12/2015 | Al-Kofahi et al. |
| 9,285,795 | B2 | 3/2016 | Nixon et al. |
| 9,589,011 | B2 | 3/2017 | Rubinstein et al. |
| 9,628,623 | B2 | 4/2017 | Vymenets et al. |
| 9,912,813 | B2 | 3/2018 | Vymenets et al. |
| 10,216,803 | B2 | 2/2019 | Ball et al. |
| 10,248,994 | B2 | 4/2019 | Grosz et al. |
| 10,332,132 | B2 | 6/2019 | Briere et al. |
| 10,540,661 | B2 | 1/2020 | Lange et al. |
| 10,545,969 | B2 | 1/2020 | Ball et al. |
| 10,621,240 | B2 | 4/2020 | Reitter et al. |
| 10,685,054 | B2 | 6/2020 | Crouse et al. |
| 10,885,561 | B2 | 1/2021 | Psota et al. |
| 11,113,740 | B2 | 9/2021 | Lenahan et al. |
| 11,470,036 | B2 | 10/2022 | Ramanathan et al. |
| 11,556,544 | B2 | 1/2023 | Lu et al. |
| 11,694,221 | B2 | 7/2023 | Ma et al. |
| 2011/0113349 | A1* | 5/2011 | Kiciman .............. G06F 16/972 |
| | | | 715/753 |
| 2016/0343037 | A1 | 11/2016 | Nicholas et al. |
| 2017/0329466 | A1 | 11/2017 | Krenkler et al. |
| 2018/0181291 | A1 | 6/2018 | Filson et al. |
| 2018/0210886 | A1 | 7/2018 | Garg et al. |
| 2019/0279522 | A1 | 9/2019 | Jafari |
| 2020/0099755 | A1 | 3/2020 | Rose et al. |
| 2022/0231985 | A1 | 7/2022 | Rapaport et al. |

* cited by examiner

PROCESS 300

PROCESS 500

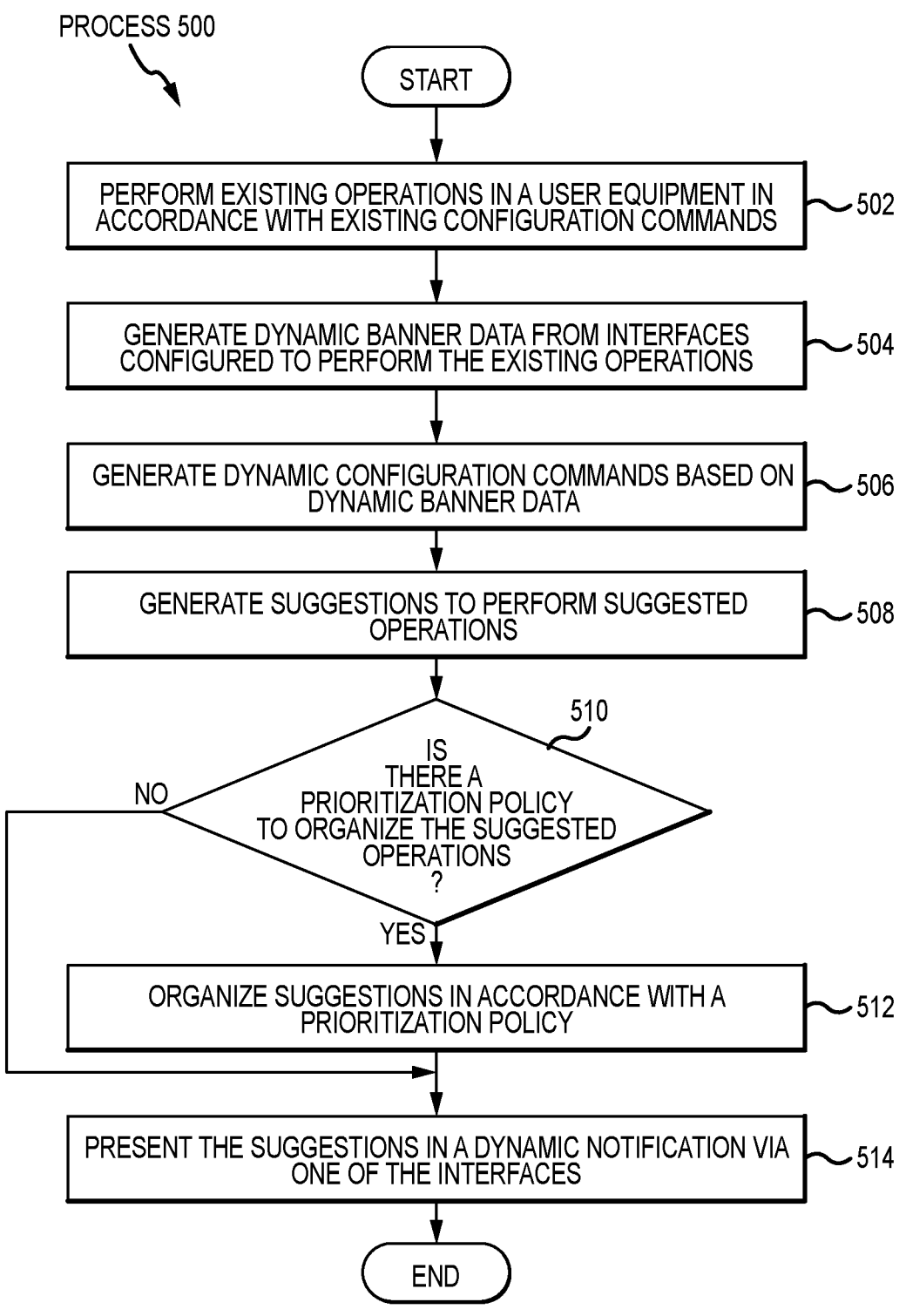

START

PERFORM EXISTING OPERATIONS IN A USER EQUIPMENT IN ACCORDANCE WITH EXISTING CONFIGURATION COMMANDS ~502

GENERATE DYNAMIC BANNER DATA FROM INTERFACES CONFIGURED TO PERFORM THE EXISTING OPERATIONS ~504

GENERATE DYNAMIC CONFIGURATION COMMANDS BASED ON DYNAMIC BANNER DATA ~506

GENERATE SUGGESTIONS TO PERFORM SUGGESTED OPERATIONS ~508

IS THERE A PRIORITIZATION POLICY TO ORGANIZE THE SUGGESTED OPERATIONS ? 510

NO

YES

ORGANIZE SUGGESTIONS IN ACCORDANCE WITH A PRIORITIZATION POLICY ~512

PRESENT THE SUGGESTIONS IN A DYNAMIC NOTIFICATION VIA ONE OF THE INTERFACES ~514

END

FIG.5

SYSTEM AND METHOD TO GENERATE SUGGESTIONS BASED ON DYNAMIC NOTIFICATION DATA

TECHNICAL FIELD

The present disclosure relates generally to predicting operation suggestions in a communication system, and more specifically to a system and method to generate suggestions based on dynamic notification data.

BACKGROUND

In some wireless communications systems, user devices waste resources trying to identify new operations to perform. These device resources may be power resources, memory resources, and processing resources that a given user device consumes while a user attempts to determine a new operation to perform in the given user device. The device resources are wasted when the given user device lacks any immediate operations that may be useful to a corresponding user. For example, device resources may be wasted by attempting to enter a search query in a search engine and scrolling through services to identify restaurants in a city that are open at a given time just to find out that there are no restaurants open in the city for the given time. In another example, device resources may be wasted in the process of trying to decide a specific service to use among multiple services available.

SUMMARY OF THE DISCLOSURE

Generating Suggestions Based on Dynamic Notification Data

In one or more embodiments, the system and method disclosed herein generate suggestions based on dynamic notification data. In particular, the system and method may be configured to provide real-time suggestions that recommend operations to be performed based at least in part upon context data associated with a user equipment.

In one or more embodiments, the system and method described herein are integrated into a practical application to provide real-time contextual suggestions based on information shown in the user device. In some embodiments, the system and method may be configured to contextually analyze images and sounds in real-time and suggest actionable prompts based on the content of the context data and a dynamic user profile associated with the user equipment. In other embodiments, the system and method are configured to provide the suggestions based at least in part upon evaluating inventory stock data of services available to the user equipment. For example, the system and method may be configured to generate a suggestion that comprises retrieving an object from a store. In this regard, the suggestion may comprise operations that guide the user to the store after determining that the store matches preferences associated with the user device and the context data.

In addition, the system and method described herein are integrated into a technical advantage of increasing processing speeds in a computer system, because processors associated with the system and method comprise a machine learning algorithm that actively generate insights for the context data. In the machine learning algorithm, the system and method may provide the dynamic configuration commands based on some or all dynamic notification data obtained from the context data. As the machine learning algorithm is trained to account for many of the situations and conditions changing in the context data, multiple dynamic configuration commands are generated to relieve stress conditions in future processing operations. In some embodiments, the system and method may generate real-time prompt suggestions that recommend operations for the user. In this regard, resources may be saved in the user equipment by identifying new relevant operations to perform. The device resources may be power resources, memory resources, and processing resources that the user equipment saves by proactively and automatically determining a new immediate operation to perform.

In one or more embodiments, the system and method may be performed by an apparatus, such as a server, communicatively coupled to multiple network components in a core network, one or more base stations in a radio access network, and one or more user equipment. Further, the system may be a wireless communication system, which comprises the apparatus. In addition, the system and method may be performed as part of a process performed by the apparatus communicatively coupled to the network components in the core network.

As a non-limiting example, the apparatus may comprise a memory and a processor communicatively coupled to one another. The memory may be configured to store multiple existing configuration commands instructing execution of one or more operations. The processor may be configured to perform multiple existing operations in accordance with the existing configuration commands, and collect dynamic notification data from one or more interfaces configured to perform the existing operations. The dynamic notification data may comprise context data representative of the existing operations performed by the one or more interfaces. Further, the processor is configured to generate multiple dynamic configuration commands based at least in part upon the dynamic notification data. The dynamic configuration commands may comprise possible updates to the existing configuration commands. Then, the processor is configured to compare the dynamic configuration commands to the existing configuration commands, determine whether the dynamic configuration commands comprise commands that are different from those comprised in the existing configuration commands, generate at least one suggestion to perform multiple suggested operations based at least in part upon the dynamic configuration commands in response to determining that the plurality of dynamic configuration commands comprise commands that are different from those comprised in the existing configuration commands, and present the at least one suggestion in a dynamic notification via the one or more interfaces.

Generating Suggestions Based on Dynamic Banner Data

In one or more embodiments, the system and method disclosed herein generate suggestions to a user equipment based on dynamic banner data. In particular, the system and method may be configured to enhance a user's experience and efficiency by providing personalized, relevant, and timely groups of suggestions to the user. In some embodiments, the system and method comprise analyzing context data associated with the user to proactively present multiple suggestion operations associated with specific services or features of the user equipment.

In one or more embodiments, the system and method described herein are integrated into a practical application of reducing application overload and difficulty accessing relevant services in the user equipment. The system and method may be configured to generate and present suggestions that comprise automatically locating multiple relevant specific services, prioritizing these services, and multiple operations to perform in association with the services. Further, the suggestions may comprise recommendations for new accessing new services, downloading new services, or subscribing to new services. In some embodiments, the system and method are configured to automatically and proactively navigate through services in the user equipment to generate the groups of suggestions based on the context data in real-time.

In addition, the system and method described herein are integrated into a technical advantage of increasing processing speeds in a computer system, because processors associated with the system and the method comprise a machine learning algorithm that actively generate insights for the context data. In the machine learning algorithm, the system and the method may provide the dynamic configuration commands based on some or all dynamic banner data obtained from the context data. As the machine learning algorithm is trained to account for many of the situations and conditions changing in the context data, multiple dynamic configuration commands are generated to relieve stress conditions in future processing operations. As a result, the system and the method save resources by providing an enhanced user experience through a dynamic banner presented in the user equipment. In one or more embodiments, the system and the method are integrated into a technical advantage of overcoming service overload challenges by presenting relevant suggestions in a prominent location on the user equipment, such as a notification or a banner. In some embodiments, the dynamic banner may be generated automatically based on location data associated with the user equipment.

In one or more embodiments, the system and method may be performed by an apparatus, such as a server, communicatively coupled to multiple network components in a core network, one or more base stations in a radio access network, and one or more user equipment. Further, the system may be a wireless communication system, which comprises the apparatus. In addition, the system and method may be performed as part of a process performed by the apparatus communicatively coupled to the network components in the core network. As a non-limiting example, the apparatus may comprise a memory and a processor communicatively coupled to one another. The memory may be configured to store multiple existing configuration commands instructing execution of one or more operations. The processor may be configured to collect dynamic banner data from one or more interfaces. The dynamic banner data may be representative of multiple existing operations performed by the one or more interfaces. Further, the processor may be configured to generate multiple dynamic configuration commands based at least in part upon the dynamic banner data. The dynamic configuration commands may be possible updates to the existing configuration commands. Further, the processor is configured to generate multiple suggestions to perform one or more suggested operations based at least in part upon the dynamic configuration commands, and present the suggestions in a dynamic banner via the one or more interfaces.

Certain embodiments of this disclosure may comprise some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 illustrates an example flowchart of a method to generate suggestions based on dynamic banner data in conjunction with the operational flows of FIGS. 4A and 4B.

DETAILED DESCRIPTION

In one or more embodiments, the systems and methods enable connectivity between all services available in a user equipment. In this regard, the system and method evaluate preferences and prioritization policies associated with a user of the user equipment to determine suggestions for the user. The suggestions may be recommendations to perform one or more operations based at least in part upon context data associated with the user equipment. In some embodiments, the context data comprises action data comprising commands to perform existing operations in the user equipment, location data identifying a geolocation of the user equipment, inventory stock data representative of the availability of services associated with a user profile corresponding to the user, and historic data comprising previous operation preferences, and previous operation history. In other embodiments, the suggestions are presented in the user equipment as dynamic notifications, dynamic banners, dynamic user profiles, or dynamic fill-in operations.

Figure 1:
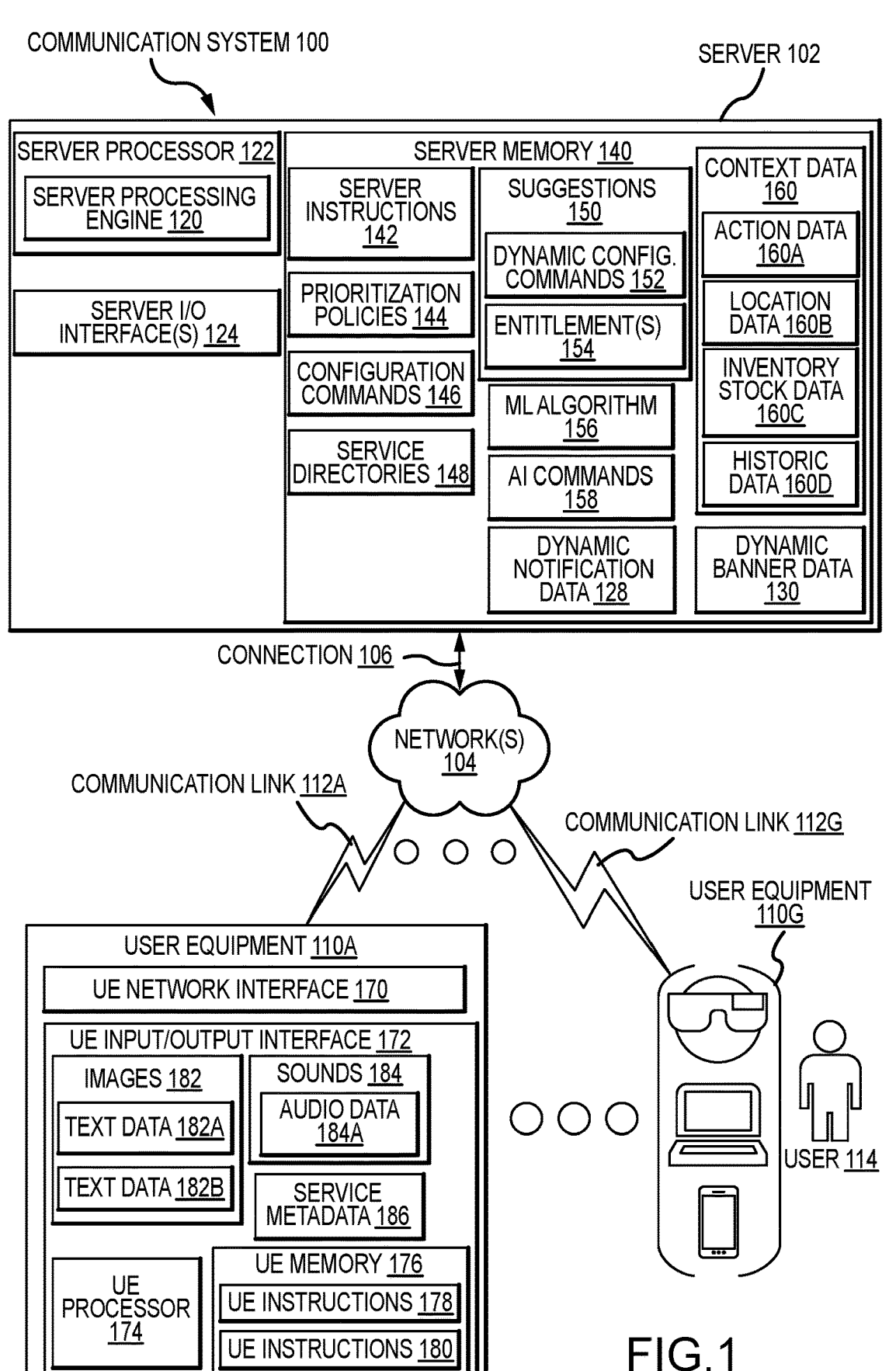
FIG. 1 illustrates an example communication system in accordance with one or more embodiments.
Figure 3:
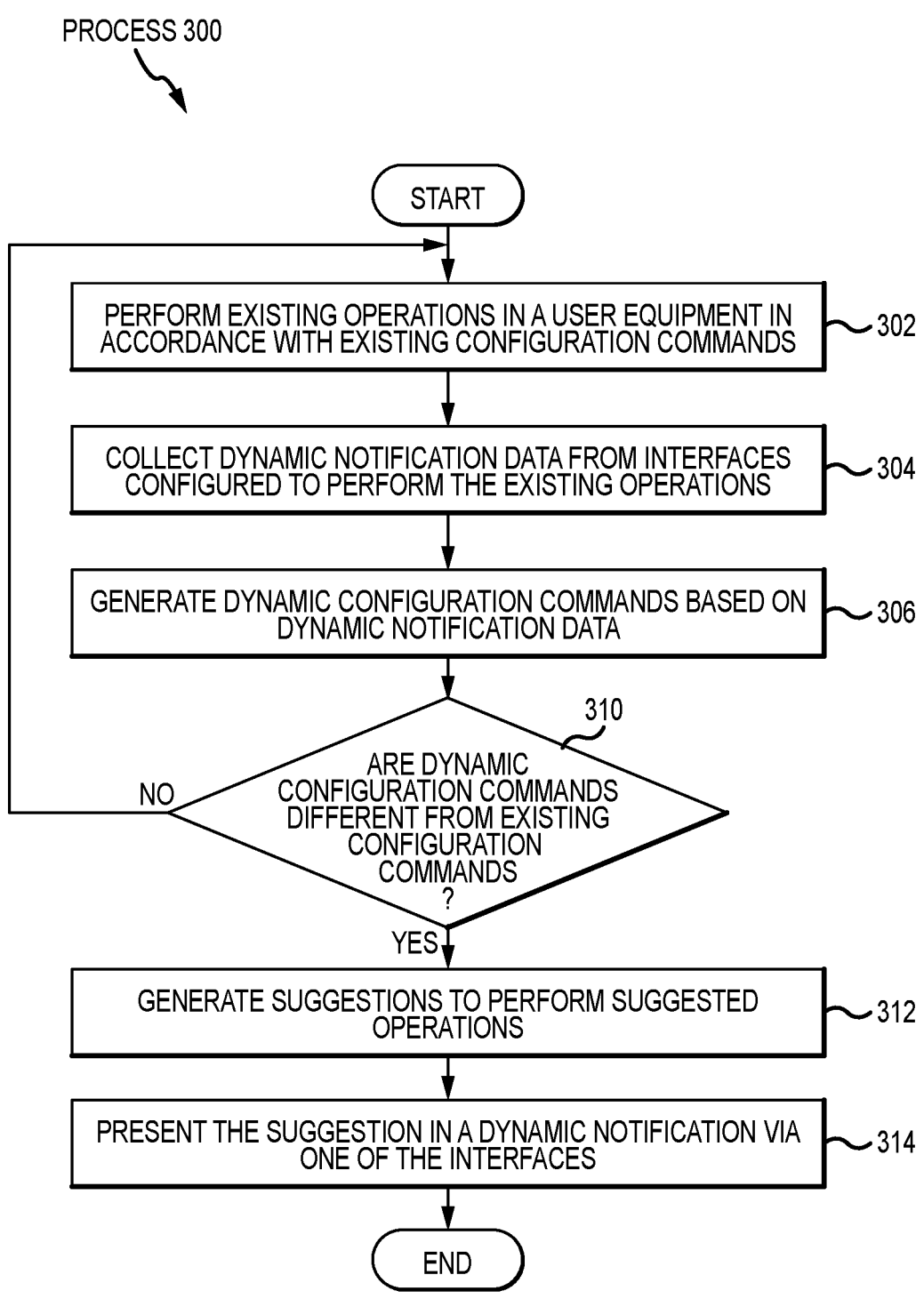
FIG. 3 illustrates an example flowchart of a method to generate suggestions based on dynamic notification data in conjunction with the operational flows of FIGS. 2A-2D.
Figure 4A:
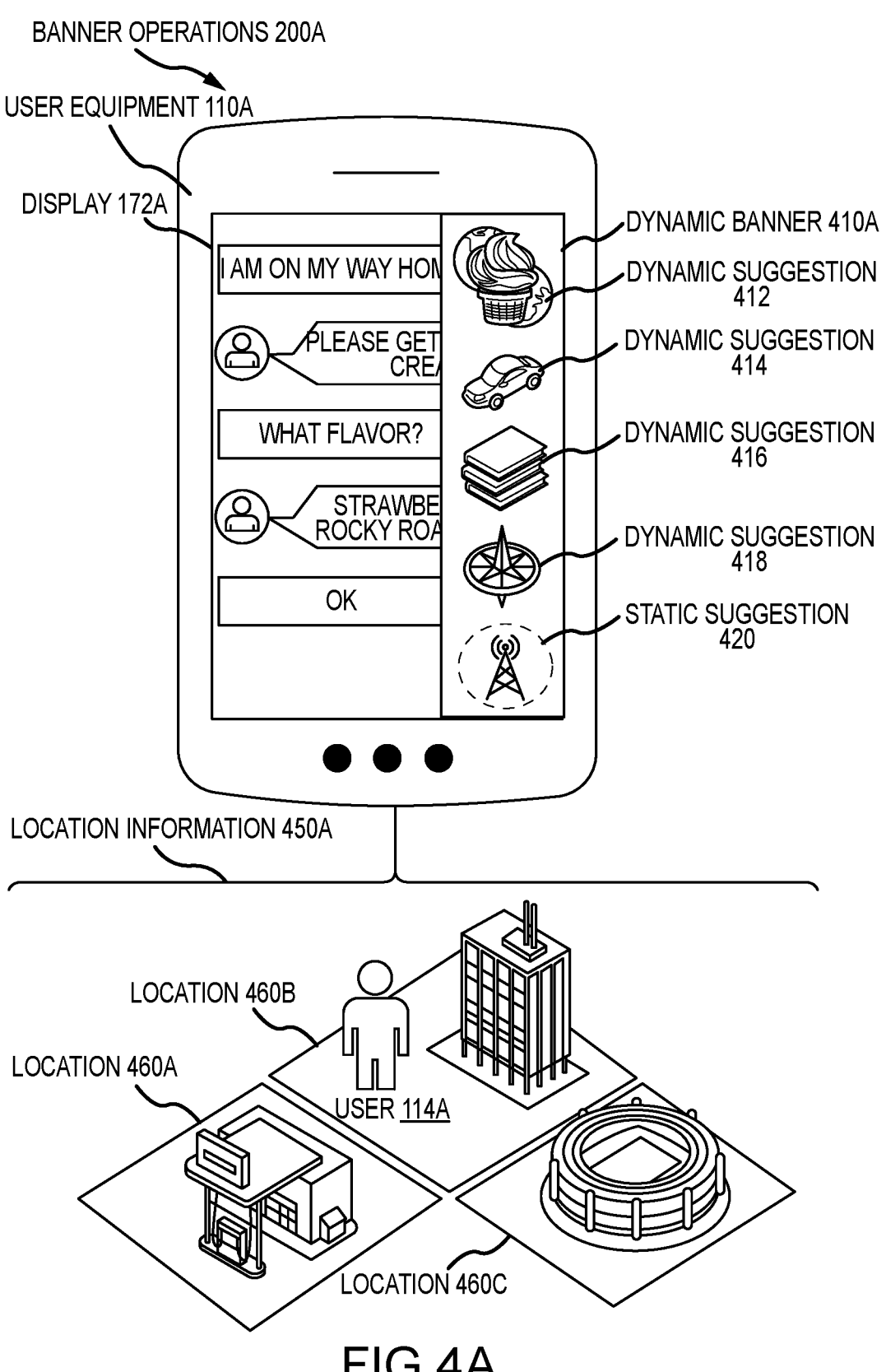
FIGS. 4A and 4B illustrate examples of one or more banner operations performed in conjunction with the example communication system of FIG. 1.
Figure 4B:
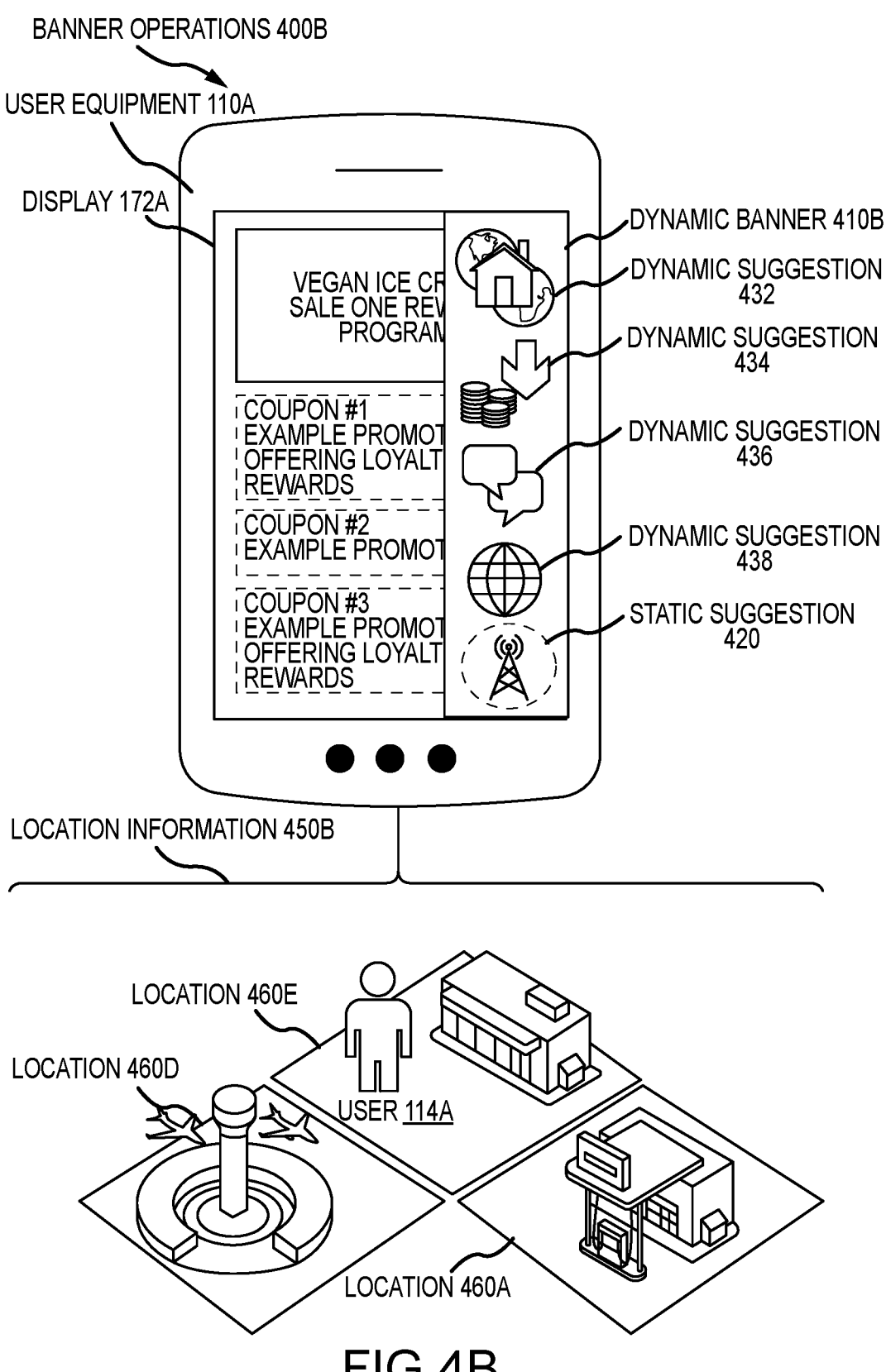

In one or more embodiments, FIG. 1 illustrates a communication system 100 in which a server 102 performs one or more notification operations based on dynamic notification data and one or more banner operations based on dynamic banner data. FIGS. 2A-2D illustrate notification operations 200A-200D performed by the communication system 100 of FIG. 1. FIG. 3 illustrates a process 300 performed by the communication system 100 of FIG. 1. FIGS. 4A and 4B illustrate banner operations 300A and 300B performed by the communication system 100 of FIG. 1. FIG. 5 illustrates a process 500 performed by the communication system 100 of FIG. 1.

Communication System Overview

FIG. 1 illustrates a diagram of a communication system 100 (e.g., a wireless communication system) that comprises a server 102 configured to generate at least one suggestion to perform suggested operations based at least in part upon one or more dynamic configuration commands, in accordance with one or more embodiments. In the communication system 100 of FIG. 1, the server 102 may be communicatively coupled to one or more networks 104. In FIG. 1, the server is communicatively coupled to multiple user equipment 110A-110G (collectively, user equipment 110) via multiple corresponding communication links 112A-112G (collectively, communication links 112) established between each user equipment 110 and the networks 104. As represented by a user equipment 110G, the user equipment 110 may be operated or attended to by one or more users 114. In the example of FIG. 1, the server 102 may be communicatively coupled to multiple additional devices in the communication system 100. While FIG. 1 shows the server 102 connected directly to the one or more networks 104, the server 102 may be located inside one of the networks 104 as part of one or more of the network components (e.g., not shown).

In one or more embodiments, the communication system 100 comprises the user equipment 110, the one or more networks 104, and the server 102. In come embodiments, the communication system 100 may comprise a Fifth Generation (5G) mobile network or wireless communication system, utilizing high frequency bands (e.g., 24 Gigahertz (GHz), 39 GHz, and the like) or lower frequency bands such (e.g., Sub 6 GHz). In this regard, the communication system 100 may comprise a large number of antennas. In some embodiments, the communication system may perform one or more monitoring operations associated with the 5G New Radio (NR) protocols described in reference to the Third Generation Partnership Project (3GPP). As part of the 5G NR protocols, the communication system 100 may perform one or more millimeter (mm) wave technology operations to improve bandwidth or latency in wireless communications.

In some embodiments, the communication system 100 may be configured to partially or completely enable communications via one or more various radio access technologies (RATs), wireless communication technologies, or telecommunication standards, such as Global System for Mobiles (GSM) (e.g., Second Generation (2G) mobile networks), Universal Mobile Telecommunications System (UMTS) (e.g., Third Generation (3G) mobile networks), Long Term Evolution (LTE) of mobile networks, LTE-Advanced (LTE-A) mobile networks, 5G NR mobile networks, or Sixth Generation (6G) mobile networks.

Communication System Components

Server

The server 102 is generally any device or apparatus that is configured to process data and communicate with the networks 104 and the user equipment 110. The server 102 may be configured to monitor, track data, control routing of signal, and control operations of certain electronic components in the communication system 100, associated databases, associated systems, and the like, via one or more interfaces. The server 102 is generally configured to oversee operations of the server processing engine 120. The operations of the server processing engine 120 are described further below. In some embodiments, the server 102 comprises a server processor 122, one or more server Input (I)/Output (O) interfaces 124, and a server memory 140 communicatively coupled to one another. The server 102 may be configured as shown, or in any other configuration.

The server processor 122 may comprise one or more processors operably coupled to and in signal communication with the one or more server I/O interfaces 124, and the server memory 140. The server processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 122 may be a programmable logic device, a microcontroller, a microprocessor, or any suitable combination of the preceding. The one or more processors in the server processor 122 are configured to process data and may be implemented in hardware or software executed by hardware. For example, the server processor 122 may be an 8-bit, a 16-bit, a 32-bit, a 64-bit, or any other suitable architecture. The server processor 122 may comprise an arithmetic logic unit (ALU) to perform arithmetic and logic operations, processor registers that supply operands to the ALU, and store the results of ALU operations, and a control unit that fetches software instructions such as server instructions 142 from the server memory 140 and executes the server instructions 142 by directing the coordinated operations of the ALU, registers and other components via the server processing engine 120. The server processor 122 may be configured to execute various instructions. For example, the server processor 122 may be configured to execute the server instructions 142 to perform functions or perform operations disclosed herein, such as some or all of those described with respect to FIGS. 1-5. In some embodiments, the functions described herein are implemented using logic units, FPGAs, ASICs, DSPs, or any other suitable hardware or electronic circuitry.

In one or more embodiments, the server I/O interfaces 124 may be hardware configured to perform one or more notification operations 200A-200D described in reference to FIGS. 2A-2D and one or more banner operations 400A and 400B described in reference to FIGS. 4A and 4B. The server I/O interfaces 124 may comprise one or more antennas as part of a transceiver, a receiver, or a transmitter for communicating using one or more wireless communication protocols or technologies. In some embodiments, the server I/O interfaces 124 may be configured to communicate using, for example, NR or LTE using at least some shared radio components. In other embodiments, the server I/O interfaces 124 may be configured to communicate using single or shared radio frequency (RF) bands. The RF bands may be coupled to a single antenna, or may be coupled to multiple antennas (e.g., for a multiple-input multiple output (MIMO) configuration) to perform wireless communications. The server I/O interfaces 124 may be configured to comprise one or more peripherals such as a network interface, one or more administrator interfaces, and one or more displays.

The server network interfaces that may be part of the server I/O interfaces 124 may be any suitable hardware or software (e.g., executed by hardware) to facilitate any suitable type of communication in wireless or wired connections. These connections may comprise, but not be limited to, all or a portion of network connections coupled to additional network components 116 in the core network 106, the user equipment 110, the Internet, an Intranet, a private network, a public network, a peer-to-peer network, the public switched telephone network, a cellular network, a local area network (LAN), a metropolitan area network (MAN), a wide area network (WAN), and a satellite network. The server network interface may be configured to support any suitable type of communication protocol.

The one or more administrator interfaces that may be part of the server I/O interfaces 124 may be user interfaces configured to provide access and control to of the server 102 to one or more users (e.g., the user 114) or electronic devices. The one or more users may access the server memory 140 upon confirming one or more access credentials (e.g., a user profile) to demonstrate that access or control to the server 102 may be modified. In some embodiments, the one or more administrator interfaces may be configured to provide hardware and software resources to the one or more users. Examples of user devices comprise, but are not limited to, a laptop, a computer, a smartphone, a tablet, a smart device, an Internet-of-Things (IoT) device, a simulated reality device, an augmented reality device, or any other suitable type of device. The administrator interfaces may enable access to one or more graphical user interfaces (GUIs) via an image generator display (e.g., one or more displays), a touchscreen, a touchpad, multiple keys, multiple buttons, a mouse, or any other suitable type of hardware that allow users to view data or to provide inputs into the server 102. The server 102 may be configured to allow users to send requests to one or more user equipment 110.

In the example of FIG. 1, the one or more displays that may be part of the server I/O interfaces 124 may be configured to display a two-dimensional (2D) or three-dimensional (3D) representation of a service. Examples of the representations may comprise, but are not limited to, a graphical or simulated representation of an application, diagram, tables, or any other suitable type of data information or representation. In some embodiments, the one or more displays may be configured to present visual information to one or more users (not shown). The one or more displays may be configured to present visual information to the one or more users updated in real-time. The one or more displays may be a wearable optical display (e.g., glasses or a head-mounted display (HMD)) configured to reflect projected images and enable user to see through the one or more displays. For example, the one or more displays may comprise display units, one or more lenses, one or more semi-transparent mirrors embedded in an eye glass structure, a visor structure, or a helmet structure. Examples of display units comprise, but are not limited to, a cathode ray tube (CRT) display, a liquid crystal display (LCD), a liquid crystal on silicon (LCOS) display, a light emitting diode (LED) display, an organic LED (OLED) display, an active-matrix OLED (AMOLED) display, a projector display, or any other suitable type of display. In another embodiment, the one or more displays are a graphical display on the server 102. For example, the graphical display may be a tablet display or a smartphone display configured to display the data representations.

In some embodiments, the server processor 122 may be configured to generate dynamic notification data 128 and dynamic banner data 130. The server processor 122 may be configured to evaluate operations associated with one or more user preferences in real-time. In some embodiments, "real-time" may refer to immediate or near immediate (i.e., within one or two seconds) communication upon an operation occurs. For example, an operation B may be considered to occur in real-time response to an operation A in a case where operation B occurs within a second after operation A. In other embodiments, "real-time" may refer to operations that occur in immediate response to triggering operations even in cases where responding operations occur several minutes after triggering operations.

The server memory 140 may be volatile or non-volatile and may comprise a read-only memory (ROM), random-access memory (RAM), ternary content-addressable memory (TCAM), dynamic random-access memory (DRAM), and static random-access memory (SRAM). The server memory 140 may be implemented using one or more disks, tape drives, solid-state drives, and/or the like. The server memory 140 is operable to store the server instructions 142, one or more prioritization policies 144, one or more existing configuration commands 146, one or more service directories 148, one or more suggestions 150 comprising one or more dynamic configuration commands 152 and one or more entitlements 154, a machine learning (ML) algorithm 156, multiple artificial intelligence (AI) commands 158, and context data 160 comprising action data 160A, location data 160B, inventory stock data 160C, and historic data 160D. In the server memory 140, the server instructions 142 may comprise commands and controls for operating one or more specific network functions (NFs) in the one or more networks 104 when executed by the server processing engine 120 of the server processor 122.

In one or more embodiments, the one or more prioritization policies 144 are configured to instruct one or more user equipment 110 to establish one or more existing configuration commands 146 or one of the dynamic configuration commands 152 to perform one or more operations in the communication system 100 in a specific order. The one or more prioritization policies 144 enable automation of the routing and configuration of ordering in the suggestions 150. For example, the prioritization policies 144 may indicate an order of the suggestions 150 in accordance with the one or more entitlements 154. In some embodiments, the one or more prioritization policies 144 may be rules and policies predetermined or dynamically assigned by a corresponding user 114 or an organization associated with the user 114.

In one or more embodiments, the existing configuration commands 146 are configured to coordinate operations of the user equipment 110. Each configuration command of the existing configuration commands 146 may be configured to provide control information to perform one or more of the operations in the user equipment 110. Further, the existing configuration commands 146 may be routing and configuration information that control access to services in the user equipment 110. The existing configuration commands 146 may be dynamically or periodically updated from the network components in the networks 104.

The service directories 148 may be configured to store service-specific information and/or user-specific information. The service directories 148 may enable the server 102 to confirm user credentials to access one or more network components in the networks 104. The service directories 148 may be configured to store provider-specific information and make the information available to the user equipment 110. The service directories 148 may enable the server 102 to validate credentials associated with a specific provider (e.g., a service or application accessed via the networks 104) against corresponding user-specific information in the service directories 148 (e.g., a user profile).

In some embodiments, the suggestions 150 are recommendations presented to the user equipment 110 based on the context data 160. The suggestions 150 may comprise one or more dynamic configuration commands 152 and the one or more entitlements 154. In one or more embodiments, the dynamic configuration commands 152 are configured to control operations in the user equipment 110. Each configuration command of the dynamic configuration commands 152 may be configured to dynamically provide control information to perform one or more of the operations based at least in part upon the analyzed data from the context data 160.

In one or more embodiments, the ML algorithm 156 may be executed by the server processor 122 to evaluate the context data 160. Further, the ML algorithm 156 may be configured to interpret and transform the context data 160 into structured data sets and subsequently stored as files or tables. The ML algorithm 156 may cleanse, normalize raw data, and derive intermediate data to generate uniform data in terms of encoding, format, and data types. The ML algorithm 156 may be executed to run user queries and advanced analytical tools on the structured data. The ML algorithm 156 may be configured to generate the one or more AI commands 158 based on current server instructions 142 and the existing configuration commands 146. In turn, the server processor 122 may be configured to generate the dynamic notification data 128 and the dynamic banner data 130 based on the outputs of the ML algorithm 156. The AI commands 158 may be parameters that modify the suggestions 150. The AI commands 158 may be combined with the existing configuration commands 146 to create the dynamic configuration commands 152. In one or more embodiments, the dynamic configuration commands 152 may be dynamically generated updates for the existing configuration commands 146.

In some embodiments, the context data 160 may comprise the action data 160A, the location data 160B, the inventory stock data 160C, and the historic data 160D. The context data 160 may comprise information representative of existing operations in the user equipment 110. The action data 160A may comprise commands to perform existing operations in the user equipment. The location data 160B may identify a geolocation of the user equipment 110. The inventory stock data 160C may be representative of an availability of services associated with a user profile corresponding to the user equipment 110. The historic data 160D may comprise [previous operation preferences and previous operation history.

User Equipment

In one or more embodiments, each of the user equipment 110 (e.g., the user equipment 110A and a user equipment 110G representative of the user equipment 110A-110G) may be any computing device configured to communicate with other devices, such as the server 102, other network components in the networks 104, databases, and the like in the communication system 100. Each of the user equipment 110 may be configured to perform specific functions described herein and interact with one or more network components in the networks 104. Examples of user equipment 110 comprise, but are not limited to, a laptop, a computer, a smartphone, a tablet, a smart device, an IoT device, a simulated reality device, an augmented reality device, or any other suitable type of device.

In one or more embodiments, referring to the user equipment 110A as a non-limiting example of the user equipment 110, the user equipment 110A may comprise a user equipment (UE) network interface 170, a UE I/O interface 172, a UE processor 174 configured to execute a UE processing engine (not shown), and a UE memory 176 comprising one or more UE instructions 178 and a dynamic user profile 180. The UE network interface 170 may be any suitable hardware or software (e.g., executed by hardware) to facilitate any suitable type of communication in wireless or wired connections. These connections may comprise, but not be limited to, all or a portion of network connections coupled to additional network components in the networks 104, the Internet, an Intranet, a private network, a public network, a peer-to-peer network, the public switched telephone network, a cellular network, a local area network (LAN), a metropolitan area network (MAN), a wide area network (WAN), and a satellite network. The UE network interface 170 may be configured to support any suitable type of communication protocol.

The UE I/O interface 172 may be hardware configured to perform one or more operations in the user equipment 110 upon execution of the server instructions 142 by the server processor 122. The UE I/O interface 172 may comprise one or more antennas as part of a transceiver, a receiver, or a transmitter for communicating using one or more wireless communication protocols or technologies. In some embodiments, the UE I/O interface 172 may be configured to communicate using, for example, 5G NR or LTE using at least some shared radio components. In other embodiments, the UE I/O interface 172 may be configured to communicate using single or shared RF bands. The RF bands may be coupled to a single antenna, or may be coupled to multiple antennas (e.g., for a MIMO configuration) to perform wireless communications. In some embodiments, the user equipment 110A may comprise capabilities for voice communication, mobile broadband services (e.g., video streaming, navigation, and the like), or other types of applications. In this regard, the UE I/O interface 172 of the user equipment 110A may communicate using machine-to-machine (M2M) communication, such as machine-type communication (MTC), or another type of M2M communication.

In one or more embodiments, the UE I/O interface 172 may comprise images 182, sounds 184, and service metadata 186. The images 182 may be any objects or shapes in the UE I/O interface 172 comprising text data 182A and image data 182B. The images 182 may be static or dynamic. The text data 182A may comprise alphanumeric data strings organized in an organized and/or randomize appearance in the UE I/O interface 172. The image data 182B may be representative of the forms presented in the UE I/O interface 172. For example, the image data 182B of the images 182 may comprise information about videos or images shown in the UE I/O interface 172 via services (e.g., user interface (UI) in applications). The sounds 184 may comprise audio data 184A. The audio data 184A may comprise representations of any sounds transmitted or received by the user equipment 110A. For example, the audio data 184A may comprise spectrograms representative of changes of the sound 184 over a predefined time duration. The metadata 186 may comprise data providing information about one or more aspects of specific types of data (i.e., the audio data 184A). For example, the metadata 186 may comprise information indicating a date of creation or reception associated with a type of data.

In some embodiments, the user equipment 110A is communicatively coupled to one or more of the networks 104 via one or more communication links 112 (e.g., the communication link 112A and the communication link 112G representative of the communication links 112). The user equipment 110A may be a device with cellular communication capability such as a mobile phone, a hand-held device, a computer, a laptop, a tablet, a smart watch or other wearable device, or virtually any type of wireless device. In some applications, the user equipment 110 may be referred to as a UE, UE device, or terminal.

The UE processor 174 may comprise one or more processors operably coupled to and in signal communication with the UE network interface 170, the UE I/O interface 172, and the UE memory 176. The UE processor 174 is any electronic circuitry, including, but not limited to, state machines, one or more CPU chips, logic units, cores (e.g., a multi-core processor), FPGAs, ASICs, or DSPs. The UE processor 174 may be a programmable logic device, a microcontroller, a microprocessor, or any suitable combination of the preceding. The one or more processors in the UE processor 174 are configured to process data and may be implemented in hardware or software executed by hardware. For example, the UE processor 174 may be an 8-bit, a 16-bit, a 32-bit, a 64-bit, or any other suitable architecture. The UE processor 174 comprises an ALU to perform arithmetic and logic operations, processor registers that supply operands to the ALU, and store the results of ALU operations, and a control unit that fetches software instructions such as the UE instructions 178 from the UE memory 176 and executes the UE instructions 178 by directing the coordinated operations of the ALU, registers, and other components via the UE processing engine (not shown). The UE processor 174 may be configured to execute various instructions. For example, the UE processor 174 may be configured to execute the UE instructions 178 to implement functions or perform operations disclosed herein, such as some or all of those described with respect to FIGS. 1-5. In some embodiments, the functions described herein are implemented using logic units, FPGAs, ASICs, DSPs, or any other suitable hardware or electronic circuitry.

In some embodiments, the dynamic user profile 180 is configured to be a centralized hub for all user profiles associated with the user 114. The dynamic user profile 180 may be configured to actively store credentials and preferences from any services associated with the user equipment 110A. In other embodiments, the dynamic user profile 180 evaluates the service directories 148 and associates the preferences of the user 114 in existing entitlements 154 to actively provide the user equipment 110A with a centralized reference profile that is updated specifically for the user 114. The dynamic user profile 180 may cross-associate user preferences among services (i.e., applications or subscriptions) and any entities frequented by the user 114 (e.g., retail organizations, airlines, restaurants, and the like). In some embodiments, the dynamic user profile 180 may provide access to a data exchange mechanism that the user equipment 110A may leverage to exchange data in endpoint terminals in physical environments and virtual environments. In this regard, the dynamic user profile 180 may provide a universal virtual wallet in the user equipment 110A.

In one or more embodiments, the user equipment 110A may perform one or more dynamic fill-in operations based on the context data 160 and the dynamic user profile 180. In some embodiments, the dynamic fill-in operations may comprise evaluation of resources associated with the user 114 (i.e., line of credit evaluation based on user preferences). In other embodiments, the dynamic fill-in operations may comprise dynamic tracking of changes in the dynamic user profile 180. For example, the dynamic fill-in operations may comprise monitoring movement of the user equipment 110A in relation to the user 114 (i.e., tracking and identifying when the user 114 is exercising) and generating a report based on the monitored movement. In another example, the dynamic fill-in operations may comprise monitoring purchasing preferences associated with the user equipment 110A in relation to the user 114 (i.e., tracking and identifying purchase preferences) and generating a report based on the monitored purchasing preferences.

Network

The networks 104 may be a network configured to manage communication sessions for the user equipment 110. In one or more embodiments, the networks 104 may establish connections between user equipment 110 and the server 102 in accordance with one or more communication protocols. In the example of FIG. 1, the networks 104 comprise one or more network components configured to perform one or more NFs. In some embodiments, the networks 104 may comprise a core network that enables the user equipment 110 to communicate with the server 102, or another type of device. The networks 104 may implement a communication method that does not require the establishment of a specific communication protocol connection between the user equipment 110 and one or more of the networks 104. The networks 104 may include one or more types of network devices (not shown), which may perform different NFs.

In some embodiments, the networks 104 may comprise a 5G NR or an LTE access network (e.g., an evolved packet core (EPC) network) among others. In this regards, the networks 104 may comprise one or more logical networks implemented via wireless connections or wired connections. Each logical network may comprise an end-to-end virtual network with dedicated power, storage, or computation resources. Each logical network may be configured to perform a specific application comprising individual policies, rules, or priorities. Further, each logical network may be associated with a particular Quality of Service (QoS) class, type of service, or particular user associated with one or more of the user equipment 110. For example, a logical network may be a Mobile Private Network (MPN) configured for a particular organization. In this example, the user equipment 110A may be configured to connect to one or more particular network slices (i.e., logical networks) in the networks 104.

In the example system 100 of FIG. 1, the networks 104 may facilitate communication within the communication system 100. This disclosure contemplates that the networks 104 may be any suitable network operable to facilitate communication between the server 102 and the user equipment 110. The networks 104 may include any interconnecting system capable of transmitting audio, video, signals, data, messages, or any combination of the preceding. The networks 104 may include all or a portion of a LAN, a WAN, an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, and the like), a Long Term Evolution (LTE) network, a Universal Mobile Telecommunications System (UMTS) network, a peer-to-peer (P2P) network, a Bluetooth network, a Near Field Communication network, a Zigbee network, or any other suitable network, operable to facilitate communication between the components of the communication system 100. In other embodiments, the communication system 100 may not have all of these components or may comprise other elements instead of, or in addition to, those above.

Notification Operations

FIGS. 2A-2D illustrates one or more notification operations 200A-200D in accordance with one or more embodiments. The notification operations 200A-200D may be performed by the server 102 or the user equipment 110. In the non-limiting example of FIGS. 2A-2D, the server 102 may be communicatively coupled to the user equipment 110A. The user equipment 110A may be configured to generate a dynamic notification 210A and a dynamic notification 210B (collectively, dynamic notifications 210) based on information shown in a display 172A. In the example of FIGS. 2A-2D, the server 102 is configured to perform text analysis comprising analyzing exchanged text messages between a user 114A and a user 114B. The server 102 extracts this information and determines that the text messages contain one or more actionable requests (i.e., action data 160A) to pick up an object (i.e., item) from a store. The server 102 may be configured to identify geolocation information associated with the user equipment 110A (i.e., the location data 160B). Upon determining the geolocation information associated with the user equipment 110A, the server 102 is configured to determine retail locations that have the object in stock. In other embodiments, the inventory stock data 160C comprises information updated over time indicating object availability. The server 102 may prompt a mapping service in the user equipment 110A to calculate a route to reach a retail location confirmed to have the object in stock. The server 102 may generate the prompt based on one or more entitlements 154 and user preferences compiled in the dynamic user profile 180. The server 102 may determine the context data 160 associated with the process of obtaining directions to the retail store that comprises the object as dynamic notification data 128. At this stage, the server 102 may generate one or more suggestions 150 indicating a recommendation to reach the retail store that has the object. As described above, the server 102 may provide the suggestion 150 in the user equipment 110A as a dynamic notification 210. In this regard, if the object is available at a nearby retail location, the server 102 may cause the dynamic notification 210 to show directions to the closest retail location with the object in stock. In some embodiments, the server 102 may enable the user equipment 110A to remotely reserve or pre-order the object from the retail location. If the object is not available at a nearby retail location, the server 102 may suggest alternative objects or farther retail locations where the object might be available.

Figures 2A, 2B:
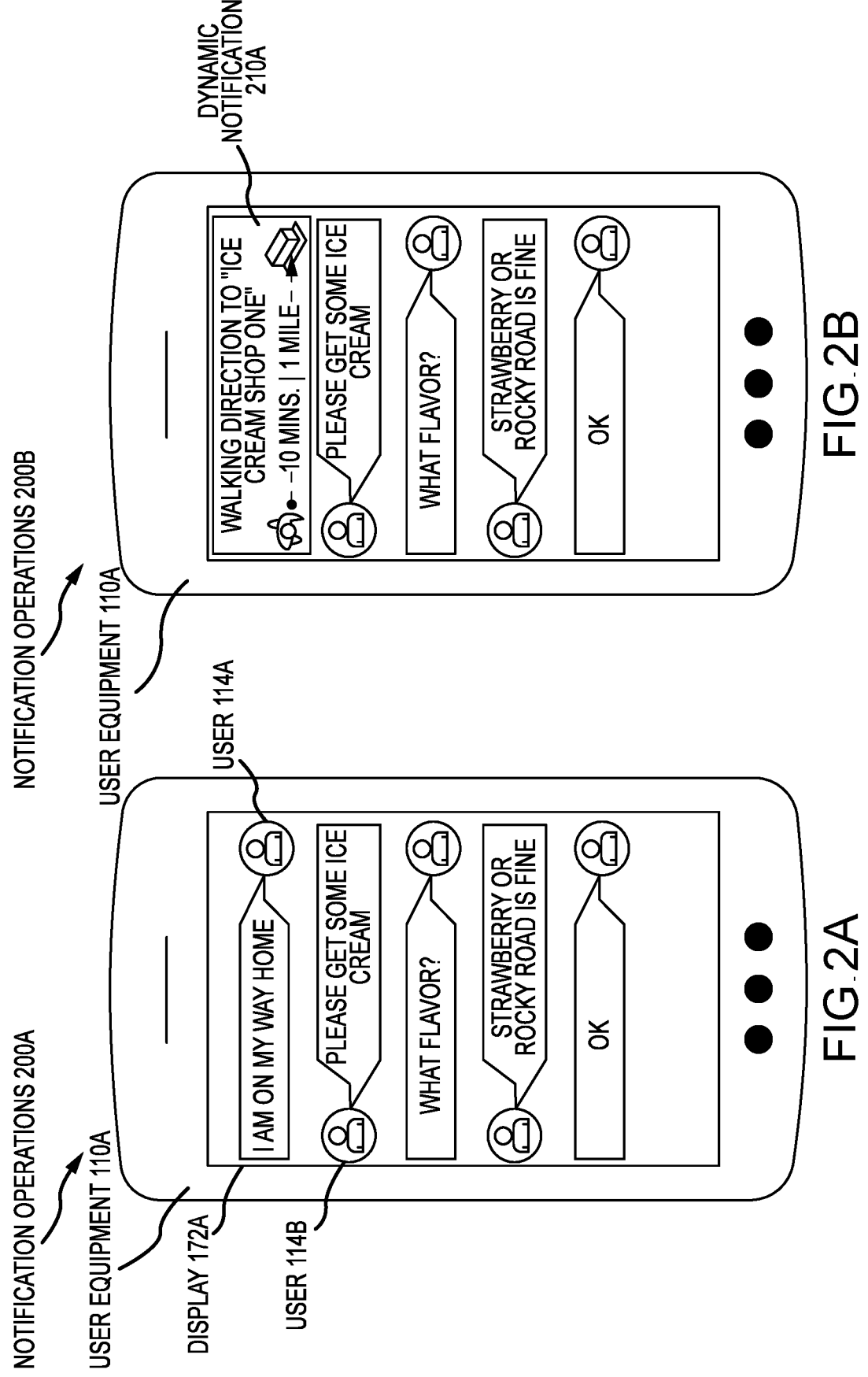
FIGS. 2A-2D illustrate examples of one or more notification operations performed in conjunction with the example communication system of FIG. 1.
Figures 2C, 2D:
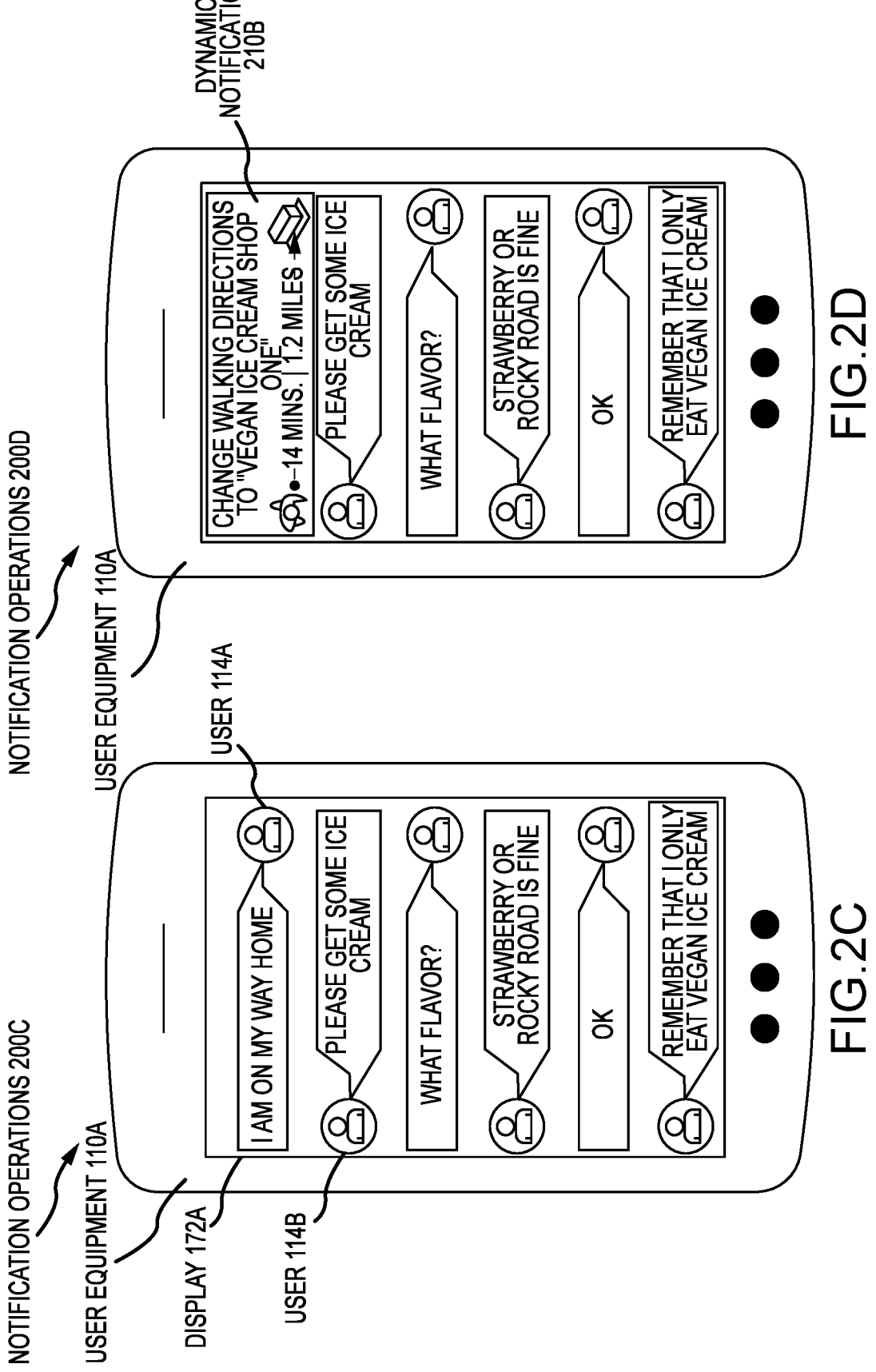

In the notification operations 200A of FIG. 2A, the display 172A in the user equipment 110A shows the user 114A and the user 114B exchanging text message with one another. In some embodiments, the server 102 is collecting the context data 160 from the user equipment 110A with the user 114A and the user 114B exchange messages with one another. As a non-limiting example, the user 114A may be associated with the user equipment 110A while the user 114B may be remotely communicating with the user equipment 110A (i.e., using another user equipment 110). More specifically, in the example of FIG. 2A, the user 114A states that "I am on my way home," which the server 102 determines to be context data 160 indicating that the user 114A is ready to go to geolocation saved as "home" in a service. In response, the user 114B states "Please get some ice cream," which the server 102 identifies as possible action data 160A to find an ice cream retail location in the way to "home." Upon the user 114A responding "What flavor?," the server 102 determines that the user 114A may agree to retrieve ice cream. At this point, the server processor 122 may comprise dynamic notification data 128 indicating that the possible ice cream retail locations near the user equipment 110A. The user 114B states "Strawberry or rocky road is fine," indicating possible objects to purchase from the retail locations identified. Then, the user 114A states "OK," which the server 102 extrapolates as new action data 160A indicating that the user 114A agrees to get strawberry or rocky road ice cream on the way to "home." In this regard, the server 102 may evaluate inventory stock data 160C of the retail locations nearby to determine locations that show strawberry or rocky road ice cream in stock. The server processor 122 may select one of the retail locations based on the historic data 160D.

In the notification operations 200B of FIG. 2B, the server generates one or more dynamic configuration commands 152 to implement the suggestions 150 based on preferences of the user 114A. For example, it may be a user preference to walk home. In FIG. 2B, the dynamic notification 210A is generated in the display 172A as a "pop-up" offering "WALKING DIRECTIONS TO 'ICE CREAM ONE'." The user 114A may tap the dynamic notification 210A to trigger execution of multiple suggestions 150 that may generate mapping of walking directions using a preferred service (i.e., application). The multiple suggestions 150 may comprise generating walking directions to "ICE CREAM ONE," and generating walking directions to "home" after confirmation that ice cream is purchased. In the notification operations 200C of FIG. 2C, the user 114B further states "Remember that I only eat vegan ice cream," which the server 102 interprets as new action data 160A to find vegan ice cream retail locations on the way to "home." In the notification operations 200D of FIG. 2D, the server 102 generates a dynamic notification 210B upon generating updates to the dynamic notification data 128. The dynamic notification 210B may be updated with an offering indicating "CHANGE WALKING DIRECTIONS TO 'VEGAN ICE CREAM SHOP ONE'," which may trigger suggestions 150 to reach a new object (i.e., vegan ice cream of strawberry flavor or rocky road flavor).

In one or more embodiments, changes to the dynamic notifications 210 may comprise options to toggle notification appearances or to select modification parameters. For example, the modification parameters may comprise selecting one or more changes such as changing the mapping to driving directions or dismissing the dynamic notification altogether. The dynamic notifications 210 may be shown via a display. The dynamic notifications 210 may be shown in a top, bottom, center, or a side portion of the display. The dynamic notifications 210 may be opaque or translucent to show content in the display behind the dynamic notifications 210.

Example Process to Generate Suggestions Based on Dynamic Notification Data

FIG. 3 illustrates an example flowchart of a process 300 to generate the suggestions 150 based on the dynamic notification data 128, in accordance with one or more embodiments. In one or more embodiments, the process 300 comprises text analysis operations in which the server processor 122 scans and extrapolates context data 160 from operations performed by the UE I/O interfaces 172. The process 300 may comprise mapping and location tracking operations based on the analyzed context data 160. Further, the process 300 may comprise inventory checking operations in which the server 102 determines product availability of an object, and notification and suggestion operations that comprise presenting the dynamic notifications 210.

The process 300 starts at operation 302, where the server 102 performs existing operations in the user equipment 110A in accordance with the existing configuration commands 146. At operation 304, the server 102 collects the dynamic notification data 128 from the UE I/O interfaces 172 configured to perform the existing operations in the form of the context data 160. In some embodiments, the dynamic notification data 128 is collected from the user equipment 110A over a predefined (e.g., preconfigured or configured) time duration. For example, the server processor 122 may be configured to evaluate the images 182 and the sounds 184. In other embodiments, the dynamic notification data 128 is collected from the user equipment 110A continuously or periodically over the predefined time duration. In yet other embodiments, the server 102 may compile and structure the dynamic notification data 128 via the server processor 122 automatically in response to collecting the one or more dynamic notification data 128 over the predefined time duration. At operation 306, the server 102 generates the dynamic configuration commands 152 based on the dynamic notification data 128. As described above, the dynamic configuration commands 152 may be parameters that control triggers and operations in the user equipment 110A. The server 102 may extrapolate the context data 160 and generate one or more suggestions 150 associated with one or more services of the service directory 148.

The process 300 continues at operation 310, where the server 102 may determine whether the dynamic configuration commands 152 comprises any commands that are different from the existing configuration commands 146. In this regard, the server 102 may compare the dynamic configuration commands 152 to the existing configuration commands 146. If the server 102 determines that the dynamic configuration commands 152 comprise commands that are not different to those comprised in the existing configuration commands 146 (i.e., NO), the process 300 returns to operation 302. In this case, at operation 302, the server 102 performs new operations in the communication system 100 using the existing configuration commands 146. If the server 102 determines that the dynamic configuration commands 152 comprise commands that are different to those comprised in the existing configuration commands 146 (i.e., YES), the process 300 proceeds to operation 312. At operation 312, the server 102 generates the suggestions 150 to perform one or more suggested operations. In this regard, the server 102 may determine the action data 160A based at least in part upon the text data 182A, the image data 182B, and the service metadata 186 extrapolated from the images 182. In a case when the action data 160A comprises retrieving an object, the server 102 identifies the location data 160B associated with one or more possible locations for the object, references the location data 160B with the inventory stock data 160C of the one or more possible locations for the object to determine whether the object is found at a first location and at a second location. In this regard, in response to determining that the object is found at the first location, the server 102 may determine that the suggestions 150 (i.e., suggested operations) comprise retrieving the object from the first location. In accordance with the historic data 160D and one or more prioritization policies 144, the server 102 may generate at least one suggestion 150 to perform the suggestions 150 comprising retrieving the object from the first location.

In this case, the process 300 may conclude at operation 314, where the server 102 presents the suggestions 150 in one or more dynamic notifications 210 via the UE I/O interface 172. In some embodiments, the at least one suggestion 150 is presented in the dynamic notification 210 via the display 174A and/or a speaker (not shown).

Banner Operations

FIGS. 4A and 4B illustrates one or more banner operations 400A and 400B in accordance with one or more embodiments. The banner operations 400A and 400B may be performed by the server 102 or the user equipment 110. In the non-limiting example of FIGS. 2A-2D, the server 102 may be communicatively coupled to the user equipment 110A. The user equipment 110A may be configured to generate a dynamic banner 410A and a dynamic banner 410B (collectively, dynamic banners 410) based on information shown in the display 172A. In the example of FIGS. 4A and 4B, the server 102 is configured to perform data collection of integrated data comprising location data, search history, and communications (i.e., image communications, sound communications, and the like) performed by the user equipment 110A. In some embodiments, the server 102 is configured to structure and process the context data 160 to identify contextually relevant services and/or potentially relevant subscriptions. The server 102 may be configured to generate the dynamic banners 410 in a floating button that is expandable upon selection and/or a hotbar for easy access.

In the banner operations 400A of FIG. 4A, the display 172A in the user equipment 110A shows the user 114A and the user 114B exchanging text message with one another. In this example, the user 114A states "OK," which the server 102 extrapolates as new action data 160A indicating that the user 114A agrees to get strawberry or rocky road ice cream on the way to "home." In this regard, the server 102 may evaluate inventory stock data 160C of the retail locations nearby to determine locations that show strawberry or rocky road ice cream in stock. The server processor 122 may select one of the retail locations based on the historic data 160D and the location information 450A indicating geolocation information of the user 114A. As a non-limiting example, the location information 450A comprises information indicating that the user 114A is located at a location 460B, which is adjacent to a location 460A and a location 460C. The location 460A may be a gas station, the location 460B may be a location associated as "work" with the user 114A, and the location 460C may be a stadium. In this non-limiting example, the server 102 may determine that the locations 460A-460C do not include any ice cream retail locations (i.e., ice cream shops). In some embodiments, the dynamic banner 410A generates a list of suggestions 150 in accordance with the prioritization policies 144. The dynamic banner 410A comprises dynamic suggestions 412-418 and a static suggestion 420.

In FIG. 4A, the combination of the context data 160 and the location information 450A indicate that the user 114A intends to go to an ice cream shop from a current location (i.e., the location 460B identified as "work"). In this regard, the dynamic suggestion 412 indicates a suggestion 150 that, when selected, provides the user equipment 110A with a mapped route from the location 460B to the "ICE CREAM SHOP ONE" as a higher-ranked suggestion 150 in the dynamic banner 410A. Further, the dynamic suggestion 414 may provide the user equipment 110A with request to use a ride-sharing service to get to the same retail location as a first middle-ranked suggestion 150 in the dynamic banner 410A, the dynamic suggestion 416 may provide the user equipment 110A with access to a service that enables the user 114A to log work performed at the location 460B for the day as a second middle-ranked suggestion 150 in the dynamic banner 410A, and the dynamic suggestion 418 may provide the user equipment 110A with a request for a mapping service offering additional ice cream retail locations as a lower-ranked suggestion 150 in the dynamic banner 410A. In some embodiments, the dynamic banner 410A may comprise one or more static suggestions 420. These static suggestions 420 may be suggestions 150 that the user 114 has selected (i.e., preselected) as a permanent easy access suggestion 150. The position of the static suggestion 420 may be limited to a specific location in the dynamic banner 410A such that the changes in the services listed in the dynamic banner 410A do not change the position of the static suggestion 420. In this example, the static suggestion 420 may provide the user equipment 110A with access to a podcast service that enables playback of audio data 184A. The banner 410 may be shown via a display. The dynamic banner 410 may be shown in a top, bottom, center, or a side portion of the display. The banner 410 may be opaque or translucent to show content in the display behind the banner 410.

In the banner operations 400B of FIG. 4B, the display 172A in the user equipment 110A shows a rewards subscription after purchasing vegan ice cream at the "VEGAN ICE CREAM SHOP ONE," which the server 102 extrapolates as new action data 160A indicating that the user 114A purchased vegan strawberry or rocky road ice cream on the way to "home." In this regard, the server 102 may evaluate mapping directions to reach "home" from the location 460E. The server processor 122 may select multiple services based on the historic data 160D and location information 450B indicating geolocation information of the user 114A. As a non-limiting example, the location information 450A comprises information indicating that the user 114A is located at a location 460E, which is adjacent to a location 460D and the location 460A. The location 460D may be an airport, the location 460E may be a location considered the "VEGAN ICE CREAM SHOP ONE," and the location 460A may be the gas station. In this non-limiting example, the server 102 may determine that the location 460A, the location 460D, and the location 460E do not include "home." In some embodiments, the dynamic banner 410B generates a list of suggestions 150 in accordance with the prioritization policies 144. The dynamic banner 410B comprises dynamic suggestions 432-438 and a static suggestion 420.

In FIG. 4B, the combination of the context data 160 and the location information 450B indicate that the user 114A intends to go to "home" from a current location (i.e., the location 460E identified as the "VEGAN ICE CREAM SHOP") after fulfilling a previous operation. In this regard, the dynamic suggestion 432 indicates a suggestion 150 that, when selected, provides the user equipment 110A with a mapped route from the location 460E to "home" as a higher-ranked suggestion 150 in the dynamic banner 410B. Further, the dynamic suggestion 434 may provide the user equipment 110A with a suggestion 150 to download a service that provides money-management visualization to help the user 114A manage financial resources as a first middle-ranked suggestion 150 in the dynamic banner 410B, the dynamic suggestion 436 may provide the user equipment 110A with access to a service that enables the user 114A to access messaging capabilities to reach the user 114B as a second middle-ranked suggestion 150 in the dynamic banner 410B, and the dynamic suggestion 438 may provide the user equipment 110A with access to a search engine as a lower-ranked suggestion 150 in the dynamic banner 410B. In some embodiments, the dynamic banner 410B may comprise the static suggestion 420 described in reference to FIG. 4B.

In one or more embodiments, changes to the dynamic banners 410 may comprise options to toggle notification appearances or to select additional modification parameters. For example, the additional modification parameters may comprise selecting one or more changes such as changing the order of the dynamic suggestions 432-438 or dismissing the dynamic banner 410B altogether.

Example Process to Generate Suggestions Based on Dynamic Banner Data

FIG. 5 illustrates an example flowchart of a process 500 to generate the suggestions 150 based on the dynamic banner data 130, in accordance with one or more embodiments. In one or more embodiments, the process 500 comprises location and data integration operations responsible for collecting and processing various forms of the context data 160. In this regard, the process 500 may determine one or more services and operations within the services that may be relevant to present in the user equipment 110A. Further, the process 500 comprises service visibility operations that use processed data to present relevant dynamic suggestions 412-418 and 432-438 in a prominent location on the user equipment 110A.

The process 500 starts at operation 502, where the server 102 performs existing operations in the user equipment 110A in accordance with the existing configuration commands 146. At operation 504, the server 102 collects the dynamic banner data 130 from the UE I/O interfaces 172 configured to perform the existing operations in the form of the context data 160. In some embodiments, the dynamic banner data 130 is collected from the user equipment 110A over a predefined (e.g., preconfigured or configured) time duration. In other embodiments, the dynamic banner data

130 is collected from the user equipment 110A continuously or periodically over the predefined time duration. In yet other embodiments, the server 102 may compile and structure the dynamic banner data 130 via the server processor 122 automatically in response to collecting the one or more dynamic banner data 130 over the predefined time duration. At operation 506, the server 102 generates the dynamic configuration commands 152 based on the dynamic banner data 130. As described above, the dynamic configuration commands 152 may be parameters that control triggers and operations in the user equipment 110A. The server 102 may analyze multiple geolocations associated with a user 114 (i.e., based on the location data 160B and the historical data 160D) comprising a first location and a second location such that the first location is a current location associated with the user 114, and the second location is a previous location associated with the user 114.

The process 500 continues at operation 510, where the server 102 may determine whether there is a prioritization policy 144 configured to organize one or more of the suggested operations. In this regard, the server 102 may determine whether the user equipment 110A is expected to self-assign a priority order to the suggestions 150. The server 102 may determine the action data 160A based at least in part upon the existing configuration commands 146. If the server 102 determines that the user equipment 110A does not comprise a prioritization policy 144 (i.e., NO), the process 500 proceeds to operation 514. If the server 102 determines that the user equipment 110A comprises a prioritization policy 144 (i.e., YES), the process 500 proceeds to operation 512. At operation 512, the server 102 organizes the suggestions 150 in accordance with the prioritization policy 144. In this case, the process 500 may conclude at operation 514, where the server 102 presents the suggestions 150 in one or more dynamic banners 410 via the UE I/O interface 172. In some embodiments, the server 102 may present the suggestions 150 in the dynamic banner 410 based at least in part upon the priority policy 144.

Example Processes

FIGS. 3 and 5 illustrate respective example flowchart of the process 300 and the process 500, in accordance with one or more embodiments. Modifications, additions, or omissions may be made to the process 300 and the process 500. The process 300 and the process 500 may include more, fewer, or other operations than those shown above. For example, operations may be performed in parallel or in any suitable order. While at times discussed as the server 102, one or more of the user equipment 110, components of any of thereof, or any suitable system or components of the communication system 100 may perform one or more operations of the process 300 and the process 500. For example, one or more operations of the process 300 and the process 500 may be implemented, at least in part, in the form of server instructions 142 of FIG. 1, stored on non-transitory, tangible, machine-readable media (e.g., server memory 140 of FIG. 1 operating as a non-transitory computer readable medium) that when run by one or more processors (e.g., the server processor 122 of FIG. 1) may cause the one or more processors to perform operations described in operations 302-314 of the process 300 and operations 502-514 of the process 500.

Scope of the Disclosure

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus, comprising:

an interface configured to perform a plurality of operations in a user equipment;

a memory communicatively coupled to the interface, comprising:

a plurality of existing configuration commands instructing execution of the plurality of operations in the user equipment; and a processor communicatively coupled to the memory and configured to:

perform, during a first period of time, the plurality of operations in the user equipment in accordance with the plurality of existing configuration commands;

collect context data from the interface during the first period of time, wherein:

the context data is representative of information surrounding the user equipment while the plurality of operations is performed by the interface during the first period of time; and the information surrounding the interface is collected by one or more additional interfaces of the user equipment;

train, during a first stage, a machine learning algorithm using historical data associated with the user equipment to account for one or more situations and conditions changing the context data;

actively generate, using the trained machine learning algorithm, a plurality of insights for the context data;

generate, using the trained machine learning algorithm, a plurality of dynamic configuration commands based at least in part upon the plurality of insights for the context data, wherein:

the plurality of dynamic configuration commands is generated to relieve stress conditions in future processing operations; and the plurality of dynamic configuration commands comprises possible updates to the plurality of existing configuration commands;

determine, using the trained machine learning algorithm, whether the plurality of dynamic configuration commands comprise commands that are different from those comprised in the plurality of existing configuration commands;

in response to determining that the plurality of dynamic configuration commands comprise commands that are different from those comprised in the plurality of existing configuration commands, generate, using the trained machine learning algorithm, a plurality of suggested operations using a specific service in the user equipment based at least in part upon the plurality of dynamic configuration commands;

modify the plurality of existing configuration commands to comprise the plurality of dynamic configuration commands to perform the plurality of suggested operations during a second period of time;

provide, via the interface, a dynamic notification to perform the plurality of suggested operations in the user equipment in accordance with a modified version of the plurality of existing configuration commands;

perform, during the second period of time, the plurality of suggested operations in the user equipment in accordance with a modified version of the plurality of existing configuration commands; and train, during a second stage, the machine learning algorithm using the historical data and the modified version of the plurality of existing configuration commands.

2. The apparatus of claim 1, wherein:

the interface is a display; and the dynamic notification is provided via the display.

3. The apparatus of claim 2, wherein in conjunction with collecting the context data during the first period of time, the processor is further configured to:

analyze a plurality of images shown in the display; and extract text data, image data, and service metadata associated with one or more services of a service directory from the plurality of images.

4. The apparatus of claim 3, wherein in conjunction with generating the plurality of dynamic configuration commands, the processor is further configured to:

determine action data based at least in part upon the text data, the image data, and the service metadata extracted from the plurality of images;

in a case when the action data comprises retrieving an object, identify location data associated with one or more possible locations for the object;

reference the location data with inventory stock data of the one or more possible locations for the object to determine whether the object is found at a first location and at a second location;

in response to determining that the object is found at the first location, determine that the plurality of suggested operations comprises retrieving the object from the first location; and in accordance with historic data and a plurality of prioritization policies, generate at least one suggestion to perform the plurality of suggested operations comprising retrieving the object from the first location.

5. The apparatus of claim 2, wherein:

the one or more additional interfaces of the user equipment further comprise a speaker.

6. The apparatus of claim 5, wherein the dynamic notification comprises an image in the display accompanied by a sound in the speaker, the sound being associated with the image.

7. The apparatus of claim 1, wherein the context data from the interface is collected over a predefined time duration.

8. A method, comprising:

performing, during a first period of time, a plurality of operations in a user equipment in accordance with a plurality of existing configuration commands, the user equipment comprising an interface configured to perform the plurality of operations in the user equipment;

collecting context data from the interface during the first period of time, wherein:

the context data is representative of information surrounding the user equipment while the plurality of operations is performed by the interface during the first period of time; and the information surrounding the interface is collected by one or more additional interfaces of the user equipment;

training, during a first stage, a machine learning algorithm using historical data associated with the user equipment to account for one or more situations and conditions changing the context data;

actively generating, using the trained machine learning algorithm, a plurality of insights for the context data;

generating, using the trained machine learning algorithm, a plurality of dynamic configuration commands based at least in part upon the plurality of insights for the context data, wherein:

the plurality of dynamic configuration commands is generated to relieve stress conditions in future processing operations; and the plurality of dynamic configuration commands comprises possible updates to the plurality of existing configuration commands;

determining, using the trained machine learning algorithm, whether the plurality of dynamic configuration commands comprise commands that are different from those comprised in the plurality of existing configuration commands;

in response to determining that the plurality of dynamic configuration commands comprise commands that are different from those comprised in the plurality of existing configuration commands, generating, using the trained machine learning algorithm, a plurality of suggested operations using a specific service in the user equipment based at least in part upon the plurality of dynamic configuration commands;

modifying the plurality of existing configuration commands to comprise the plurality of dynamic configuration commands to perform the plurality of suggested operations during a second period of time;

providing, via the interface, a dynamic notification to perform the plurality of suggested operations in the user equipment in accordance with a modified version of the plurality of existing configuration commands;

performing, during the second period of time, the plurality of suggested operations in the user equipment in accordance with a modified version of the plurality of existing configuration commands; and training, during a second stage, the machine learning algorithm using the historical data and the modified version of the plurality of existing configuration commands.

9. The method of claim 8, wherein:

the interface is a display; and the dynamic notification is provided via the display.

10. The method of claim 9, wherein in conjunction with collecting the context data during the first period of time, the method further comprises:

analyzing a plurality of images shown in the display; and extracting text data, image data, and service metadata associated with one or more services of a service directory from the plurality of images.

11. The method of claim 10, wherein in conjunction with generating the plurality of dynamic configuration commands, the method further comprises:

determining action data based at least in part upon the text data, the image data, and the service metadata extracted from the plurality of images;

in a case when the action data comprises retrieving an object, identifying location data associated with one or more possible locations for the object;

referencing the location data with inventory stock data of the one or more possible locations for the object to determine whether the object is found at a first location and at a second location;

in response to determining that the object is found at the first location, determining that the plurality of suggested operations comprises retrieving the object from the first location; and in accordance with historic data and a plurality of prioritization policies, generating at least one suggestion to perform the plurality of suggested operations comprising retrieving the object from the first location.

12. The method of claim 9, wherein:

the one or more additional interfaces of the user equipment further comprise a speaker.

13. The method of claim 12, wherein the dynamic notification comprises an image in the display accompanied by a sound in the speaker, the sound being associated with the image.

14. The method of claim 8, wherein the context data from the interface is collected over a predefined time duration.

15. A non-transitory computer readable medium storing instructions that when executed by a processor cause the processor to:

perform, during a first period of time, a plurality of operations in a user equipment in accordance with a plurality of existing configuration commands the user equipment comprising an interface configured to perform the plurality of operations in the user equipment;

collect context data from the interface during the first period of time, wherein:

the context data is representative of information surrounding the user equipment while the plurality of operations is performed by the interface during the first period of time; and the information surrounding the interface is collected by one or more additional interfaces of the user equipment;

train, during a first stage, a machine learning algorithm using historical data associated with the user equipment to account for one or more situations and conditions changing the context data;

actively generating, using the trained machine learning algorithm, a plurality of insights for the context data;

generate, using the trained machine learning algorithm, a plurality of dynamic configuration commands based at least in part upon the plurality of insights for the context data, wherein:

the plurality of dynamic configuration commands is generated to relieve stress conditions in future processing operations; and the plurality of dynamic configuration commands comprises possible updates to the plurality of existing configuration commands;

determine, using the trained machine learning algorithm, whether the plurality of dynamic configuration commands comprise commands that are different from those comprised in the plurality of existing configuration commands;

in response to determining that the plurality of dynamic configuration commands comprise commands that are different from those comprised in the plurality of existing configuration commands, generate, using the trained machine learning algorithm, a plurality of suggested operations using a specific service in the user equipment based at least in part upon the plurality of dynamic configuration commands;

modify the plurality of existing configuration commands to comprise the plurality of dynamic configuration commands to perform the plurality of suggested operations during a second period of time;

provide, via the interface, a dynamic notification to perform the plurality of suggested operations in the user equipment in accordance with a modified version of the plurality of existing configuration commands;

perform, during the second period of time, the plurality of suggested operations in the user equipment in accordance with a modified version of the plurality of existing configuration commands; and train, during a second stage, the machine learning algorithm using the historical data and the modified version of the plurality of existing configuration commands.

16. The non-transitory computer readable medium of claim 15, wherein:

the interface is a display; and the dynamic notification is provided via the display.

17. The non-transitory computer readable medium of claim 16, wherein in conjunction with collecting the context data during the first period of time, the processor is further caused to:

analyze a plurality of images shown in the display; and extract text data, image data, and service metadata associated with one or more services of a service directory from the plurality of images.

18. The non-transitory computer readable medium of claim 17, wherein in conjunction with generating the plurality of dynamic configuration commands, the processor is further caused to:

determine action data based at least in part upon the text data, the image data, and the service metadata extracted from the plurality of images;

in a case when the action data comprises retrieving an object, identify location data associated with one or more possible locations for the object;

reference the location data with inventory stock data of the one or more possible locations for the object to determine whether the object is found at a first location and at a second location;

in response to determining that the object is found at the first location, determine that the plurality of suggested operations comprises retrieving the object from the first location; and in accordance with historic data and a plurality of prioritization policies, generate at least one suggestion to perform the plurality of suggested operations comprising retrieving the object from the first location.

19. The non-transitory computer readable medium of claim 16, wherein:

the one or more additional interfaces of the user equipment further comprise a speaker.

20. The non-transitory computer readable medium of claim 19, wherein the dynamic notification comprises an image in the display accompanied by a sound in the speaker, the sound being associated with the image.

* * * * *